March 22, 1955 F. P. STROTHER 2,704,633
ANALYZING APPARATUS
Filed Aug. 10, 1950 3 Sheets-Sheet 1
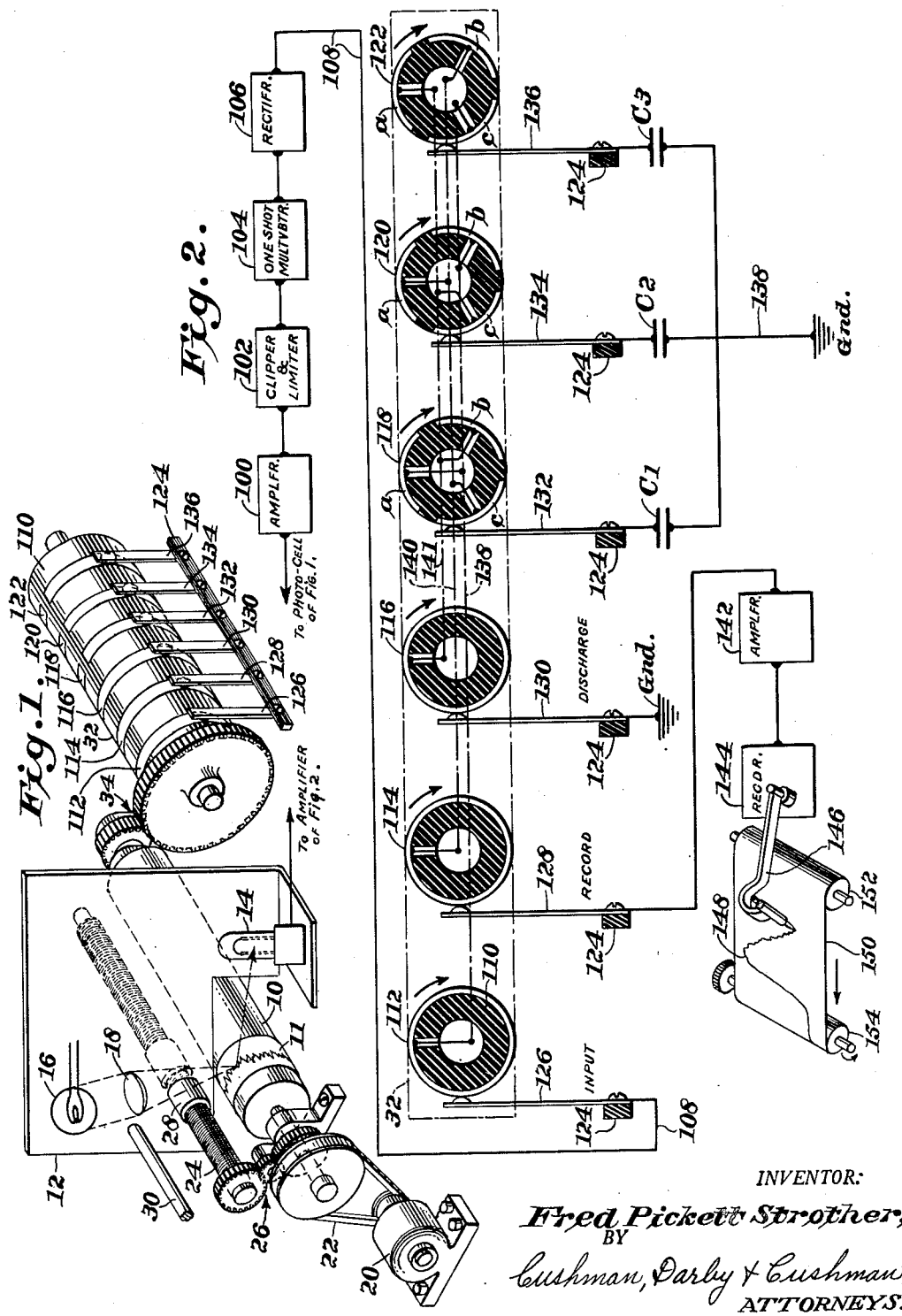
INVENTOR:
*Fred Pickett Strother*,
BY
*Cushman, Darby & Cushman,*
ATTORNEYS.

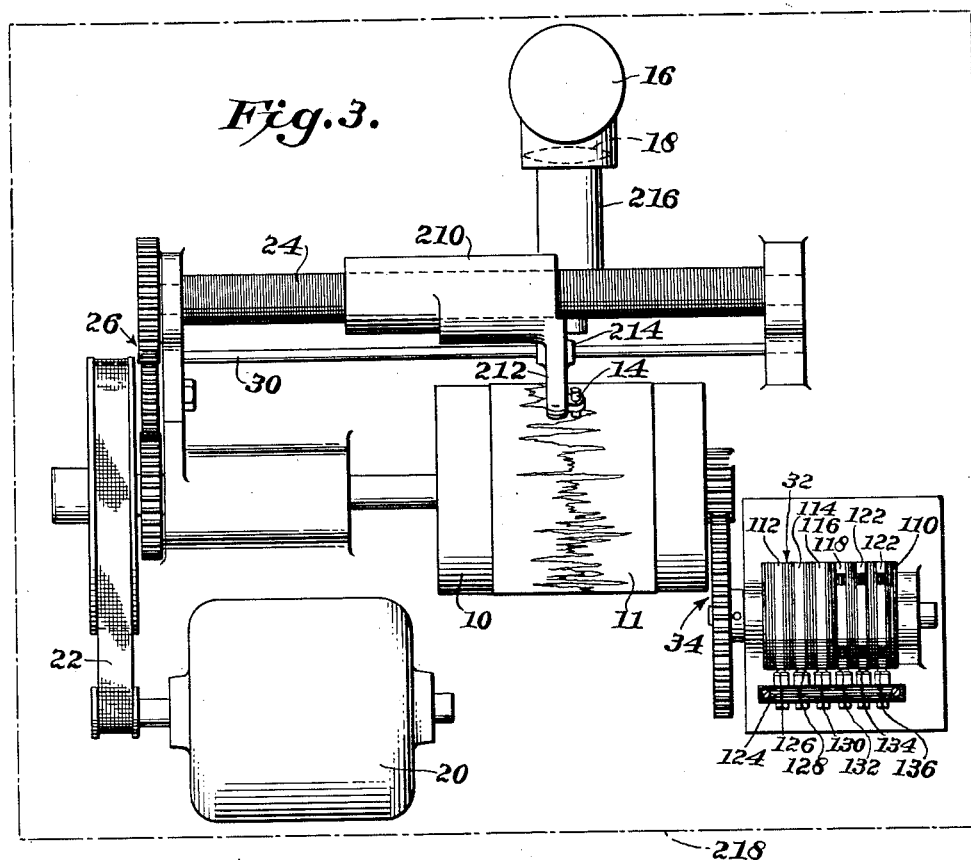
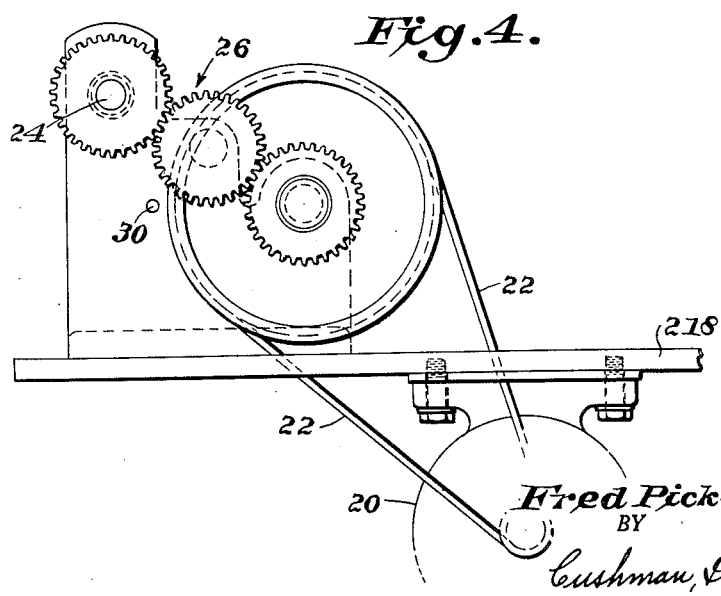

March 22, 1955 F. P. STROTHER 2,704,633
ANALYZING APPARATUS
Filed Aug. 10, 1950 3 Sheets-Sheet 3
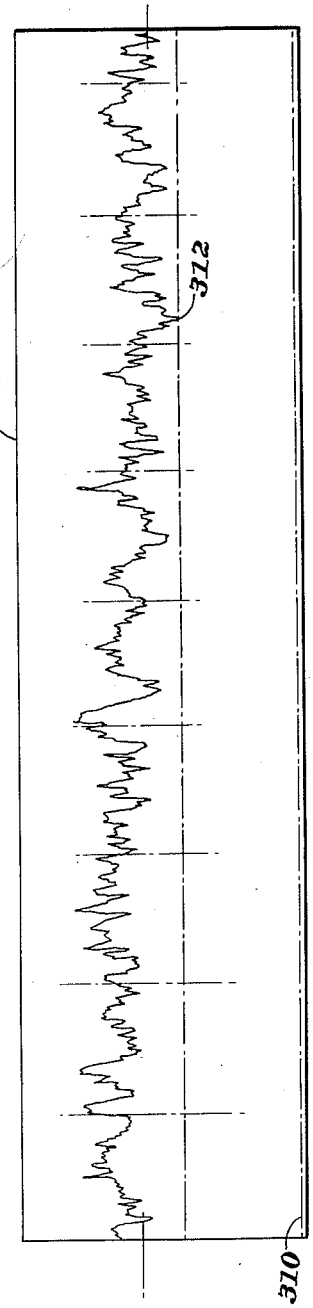
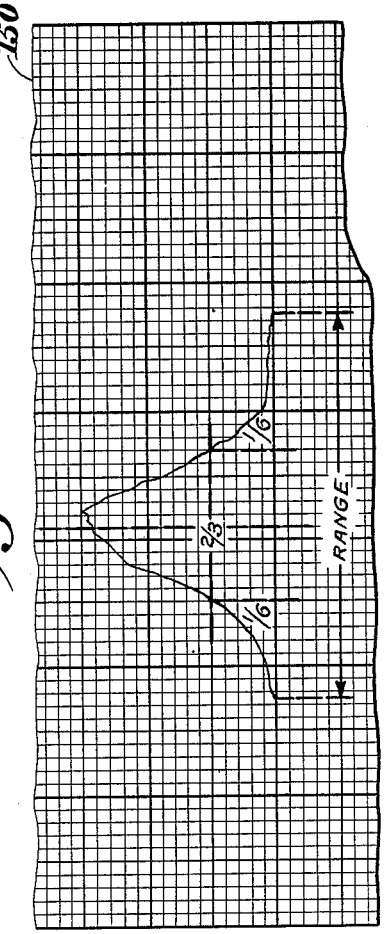
INVENTOR:
Fred Pickett Strother,
BY
Cushman, Darby & Cushman
ATTORNEYS.

# United States Patent Office 2,704,633
Patented Mar. 22, 1955

2,704,633

ANALYZING APPARATUS

Fred P. Strother, Shawmut, Ala., assignor to West Point Manufacturing Company, West Point, Ga., a corporation of Alabama Application August 10, 1950, Serial No. 178,663

9 Claims. (Cl. 235—58)

This invention relates to methods and apparatus for analyzing the occurrences of indicating areas on the surface of a member.

It is frequently desirable to analyze the surface of a member to determine the existence of holes, ridges, lines, or the like. For example, it is often necessary to analyze the configuration of a curve on a record or chart, or to determine the number and extent of blemishes or holes in a piece of leather or other material. As an example, in the manufacturing of textiles it is necessary to analyze variations in the diameter of fiber or yarn and the like. The first step in the diameter analyzing procedure is to put the sample through a device which records, as an ink line on a chart, the variations in diameter. Various statistical information is then derived from the chart, such as the average variation from a mean diameter, and other similar information. It is generally considered that the minimum information on a set of data includes the average deviation, the standard deviation, and the number of observations. It is also desirable that the frequency distribution of the variations be recorded.

In the textile industry, it has been found that chart records of cross-sectional uniformity of sliver, roving and yarn have been difficult to evaluate. Several attempts have been made to determine the standard deviation of these measurements but all attempts have proven impractical. The analysis, as commonly practiced, requires about ten minutes per chart, is very tedious, and is subject to errors in interpretation. This analysis, moreover, does not give the standard deviation. By my invention, however, I am able to produce an output curve which represents the frequency of distribution of diameter deviations as a function of the range of deviations, and this curve may be very quickly analyzed to find average deviation and other values.

Therefore, an object of my invention is to provide means for analyzing a member bearing indicating areas of some form.

A further object of my invention is to provide means for recording the frequency of occurrences of indicating areas on a member as a function of the location of the areas.

A further object of my invention is to provide a method of determining the frequency of occurrences of indicating areas on a member as a function of the location of the areas.

A further object of my invention is to provide means for analyzing the frequency distribution of areas on a record wherein the analysis is not dependent upon the precise characteristics of the areas.

A further object of my invention is to provide means for sequentially and simultaneously totalizing the occurrences of indicating areas, recording the total number of areas and erasing the total after the latter has been recorded.

Further objects and the entire scope of the invention will be apparent from the following detailed description and from the appended claims. It will be understood that the detailed description is given for purposes of illustration only and the scope of my invention will be determined from the claims.

A better understanding of my invention may be obtained from the drawings, in which:

Figure 1 shows the general arrangement of a structural embodiment of my invention.

Figure 2 shows a schematic layout of electric circuit components of my invention.

Figure 3 shows a plan view of an actual structural embodiment of the arrangement shown in Figure 1.

Figure 4 shows an end view of the structure of Figure 3.

Figure 5 shows an input chart to be analyzed.

Figure 6 shows an output curve derived from the chart of Figure 5.

A general understanding of my invention may be had with reference to Figure 1 which shows a scanning drum 10 having mounted thereon a record chart 11. A panel unit indicated diagrammatically at 12 is associated with the scanning drum and the panel has mounted thereon a photocell unit 14 and light source 16. Light from the source 16 is focused into a converging beam by lens system 18 and light reflected from the surface of the drum, or from the surface of the record member when the latter is present, is directed to the light sensitive unit 14.

A motor 20 is operatively connected to the scanning drum 10 by means of a belt drive 22, and as the motor is operated, the scanning drum 10 revolves causing various areas of the chart 11 to pass beneath the light focused by lens 18. The result of this is that the light sensitive unit 14 will receive light in amounts which depend upon the reflecting qualities of the particular elemental area of the chart 11 which is being scanned.

The panel unit 12 is further mounted for movement relative to the axis of the scanning drum 10 in the following manner: A threaded lead screw 24 is mounted substantially parallel to the axis of the scanning drum 10 and is rotated by gearing indicated generally at 26 interconnecting the scanning drum and the lead screw 24. The panel is equipped with a threaded lug 28 which receives the lead screw 24. The lug 28 is fixedly secured to the panel 12 and, therefore, as lead screw 24 is rotated, the panel 12 is moved in a path parallel to the axis of both the screw 24 and the drum 10. The panel 12 is further supported for sliding movement by means of slide rod 30 which is also mounted in any convenient manner parallel to the screw 24. The centers of screw 24 and rod 30 are separated a sufficient distance to positively prevent rotation of the panel 12 about the screw 24. A proper combination of gearing 26 and threaded pitch on screw 24 is selected so that the panel 12 is moved during each revolution of the drum 10 only a slight distance. Preferably, the light beam, where it impinges on the chart 11, will be as small in diameter as possible and the movement of the panel and, hence, the beam, sidewise during a revolution of the drum will place the beam immediately beside the area it scanned on the previous revolution.

From the equipment thus far described, it will be obvious that the chart 11, or whatever material is being analyzed, will undergo a continuous scan in a helical path. Since the record will have a beginning and an end, usually constituted by closely abutting the ends of a record, and since the sidewise movement of the panel 12 will be very slight during one revolution, the scanning operation may be accordingly thought of as successively scanning elemental lengths of the member 11 in closely adjacent parallel lines.

It will now be understood that the panel 12 at the beginning of an analyzing operation may be positioned at the left hand end of screw 24 (as viewed in Figure 1), and as the drum 10 is rotated, the panel will move to the right and begin scanning a chart as indicated at 11. If the chart 11 is of such character that it comprises light colored paper and an ink line has previously been placed thereon ranging across the width of the chart as in a temperature curve or diameter-fluctuation curve, then as the light beam senses occurrences of the ink line, there will be a reduction in the amount of light reflected from the line itself. These changes will be converted into electrical form by means of the light sensitive unit 14 and employed in suitable electronic apparatus (to be hereinafter more fully described) to produce an indication of the frequency of occurrences of the indicating marks which have appeared during one revolution of the drum.

It will be apparent that a single revolution of the drum may be employed to figuratively mean a lesser portion of a revolution.

In addition to the apparatus thus far described in connection with Figure 1, there is further provided a switching drum 32 which is rotated by means of gearing 34 between the scanning drum 10 and the just-mentioned switching drum 32. The function of this switching drum will be more fully described below.

The signals derived from the light sensitive unit 14 are employed to produce a permanent record in the manner now to be described: The output of the light sensitive unit 14 is supplied to the input of an amplifier 100 (Figure 2), this amplifier being of any well-known type which has a sufficient number of stages to produce an increasing output signal when the output of the light sensitive unit 14 decreases because of reduced light reflected from an indicating mark on the chart 11. The output of amplifier 11 may then be connected to the input of a clipping and limiting circuit 102. This being a conventional circuit arranged to shape the output of the amplifier into a pulse for triggering a one-shot multivibrator 104. The output of the multivibrator may then be connected to the input of a rectifier 106 which will permit only uni-directional signals to pass to the line 108.

With the equipment thus far described, it will be apparent that each time an indicating area on the chart 11 diminishes the amount of light reflected into the device 14, the changing output as amplified by circuit 100 and clipped by circuit 102 will cause multivibrator 104 to cycle and produce an output pulse of predetermined duration. This output pulse will then proceed through rectifier 106 wherein any spurious signals in the opposite direction will be eliminated and a pulse will appear on lead 108. It will be understood that the pulse on 108 may be detected by connecting suitable receiving equipment between this lead and ground. It will be further understood that the circuits mentioned in connection with the foregoing are old and well-known and may be found in any electronic textbook. For example, the book by F. E. Terman, entitled "Radio Engineering," Third edition, McGraw-Hill Company, New York, 1947, will be adequate as a source of circuit details.

The pulses occurring on lead 108 are now totalized during the scanning of each elemental length of the scanning drum 10 (or predetermined portion thereof), and the total is made of record. This operation is carried out by means of the previously mentioned switching drum 32, as will now be described: The switching drum 32 is comprised of a hollow cylindrical body of insulating material 110, into the surface of which are embodied three continuous conducting slip rings 112, 114, and 116, and also three segmental commutator rings 118, 120, and 122. An insulating support bar 124 is fixedly supported adjacent the periphery of the switch drum 32 and mounted thereon are conductive brushes which co-operate with the slip rings and commutator rings. Brushes 126, 128 and 130 contact slip rings 112, 114 and 116, respectively, and brushes 132, 134 and 136 contact commutator rings 118, 120 and 122, respectively. Figure 2 includes a diagrammatic expansion of the drum 32, as shown in Figure 1, and will be hereinafter referred to. In this showing, the same numerals are used as in Figure 1. The brushes 132, 134 and 136 are connected, respectively, to storage capacitances $C_1$, $C_2$ and $C_3$. The oposite sides of these capacitances are interconnected to a common ground terminal 138. The gearing 34 (Figure 1) operates the switching drum 32 at one-third the speed of scanning drum 10, and means are provided during each revolution of the scanning drum 10 for connecting the lead 108 to one of the capacitances for accumulating a total charge. At the same time, means are provided for connecting another of the capacitances to a recording instrument and for connecting the third of the capacitances to ground for discharging the charge preparatory to another cycle of operation.

In greater detail, each of the slip rings 112, 114 and 116 is connected to a switching drum bus 138, 140 and 141, respectively. These busses are carried in the hollow core of the switching drum 32 and are shown as chain lines in Figure 2. Each of the slip rings is connected to its bus by means of a lead extending through a suitable aperture in the body of the scanning drum 32. The commutator rings 118, 120 and 122 are made up of three sections of substantially 120° each. These are represented as sections $a$, $b$, and $c$ in each instance (Figure 2). Bus 138 is connected to segments 118$a$, 120$b$ and 122$c$. Bus 140 is connected to segments 118$c$, 120$a$ and 122$b$, and bus 141 is connected to segments 118$b$, 120$c$ and 122$a$.

Starting with the position of the drum shown in Figure 2, a circuit may be traced from lead 108 through brush 126 into slip ring 112 and then through bus 138 to segment 122$c$ and from there, through brush 136 to capacitances $C_3$. Thus, as scanning drum 10 goes through one revolution the segment 122$c$ will connect lead 108 to charge capacitance $C_3$ and a charge will build up on $C_3$ representative of the total number of pulses received through lead 108. When drum 10 begins its next revolution, segment 122$b$ will then be connected to $C_3$ and a circuit may be traced back from segment 122$b$ through bus 140 to slip ring 114, and from there, through brush 128 to an output amplifier 142. The total charge on capacitances $C_3$ is then amplified by 142 and the output is applied to an ink-line recorder 144. This recorder may be of any conventional variety, such as a Brush recorder, or such recorder as described at page 148 of Electronics Magazine for March, 1946, McGrew-Hill, available on the market, which draws a line the position of which is proportional to the potential applied to the device. The recording arm of this unit is indicated at 146, and this arm is shown describing a curve 148 on a record strip 150 which is diagrammatically shown as adapted for movement between two rolls 152 and 154. The last-mentioned rolls will be arranged to move relatively slow in contrast to the movement of drum 32 so that the readings from each successive revolution of the drum 10 will be spaced apart in the direction of movement of the record 150 by merely the width of the ink line being drawn by the arm 146.

On the third revolution of the drum 10, the brush 136 will be brought into contact with segment 122$a$ and a circuit then traced from $C_3$ through bus 141 to slip ring 116, and from there, through brush 130 to ground. With this connection established, $C_3$ will be discharged and prepared for the next revolution of drum 10, at which time brush 136 will again be brought into contact with segment 122$c$. $C_3$ is discharged as explained because the connection to the recorder does not itself provide a discharge path.

Thus, from the foregoing operational analysis, it will be observed that during one revolution of drum 10, a charge is accumulated on a capacitance, during the next revolution, the accumulated charge is recorded, and on the following revolution, the accumulated charge is discharged. Since these three operations are required in the particular embodiment being described, capacitances $C_1$ and $C_2$ are employed to make the operation continuous. From an inspection of Figure 2, it will be observed that each of the busses 138, 140 and 141 is interconnected to the next following segment of the commutator rings 118, 120 and 122, in each instance. That is, one of the three operations is being performed during each revolution of the drum 10. For example, while $C_3$ is accumulating a charge on bus 138, $C_2$ is being discharged through bus 141, and $C_1$ is having its charge recorded through bus 140. It is thus apparent that each operation is going on simultaneously.

It will be obvious that many modifications may be made of the foregoing apparatus and it will still be possible to practice my invention in its broad aspects. That is, lead 108 could be connected directly to the light sensitive unit 14, or only through an amplifier, and the fluctuations thus received could be directly recorded on a single capacitance (this would have the disadvantage, however, of making the accumulated charge dependent upon the light reflecting qualities of the indicating areas on the chart 11), and a single capacitance could be used if sufficient time or space were permitted between the end and beginning of a scanning operation to record the accumulated charge, and then to discharge the capacitance preparatory to another cycle. The preferred embodiment which I have described, however, permits of a continuous operation and one which is furthermore independent of the quality of the chart 11.

Figure 3 shows a plan view of an actual arrangement of the apparatus schematically shown in Figure 1. Figure 4 further shows an end view of the apparatus of Figure 3. In each of these figures, like parts are denoted by the same reference characters employed in connection with Figures 1 and 2. In this structural embodiment, the panel schematically indicated as 12 in Figure 1 is comprised of an elongated housing 210 which is internally threaded to receive the screw 24. This housing has an extending arm member 212 which contains a slide bushing 214 to receive the guide rod 30. The arm 214 also extends and provides for a mounting of the light sensitive unit 14. Also mounted on the housing 210 and extending therefrom, is a tubular column 216 which supports the light source and the lens system indicated in the dash lines at 18.

The complete unit is mounted on a base member 218. Suitable upstanding members are mounted on the base 218 to provide bearing surfaces for the movable parts, such as screw 24, drum 10, and the like. These mounting members may be of any conventional design and it is believed unnecessary to discuss the details of them in this specification.

The operational use of the apparatus which I have described will now be explained in connection with the analysis of a chart representing cross-sectional uniformity of textile samples. Reference to Figure 5 shows a chart made on a device commonly called a slivergraph, this being a machine well-known in the textile art, which draws a curve representative of the diameter of a sample length of sliver, roving, or yarn. Such device may be further understood by reference to page 249 of the first edition of The American Cotton Handbook, American Cotton Handbook Company, New York, New York. The chart, as shown in Figure 5, is arranged to be of a length approximately equal to the circumference of the scanning drum 10 of my apparatus, and it is this chart, designated as 11, which is wrapped around the drum 10, as shown in Figures 1 and 3. With the chart placed upon the drum 10, and the motor 20 energized, the light beam will begin to scan the chart 11, beginning at one edge thereof. For purposes of illustration, it will be assumed that the scanning begins at the lower edge of the chart, as shown in Figure 5. In other words, the first line scanned will be along the elemental length of the chart indicated by the chain line 310 in Figure 5. As the scanning progresses, it will be understood that successive elemental lengths will be scanned in closely adjacent lines until the light beam has passed off the upper edge of the chart 11 (as shown in Figure 5). As the scanning lines progress from the line indicated at 310 until the scan intercepts an occurrence of the ink line as at the point 312 (Figure 5), the output recorder 144 (Figure 2) will have received no signal and the arm 146 will draw a straight line along one edge of the output record 150. When the scanning beam reaches a position on the chart 11 where the occurrence 312 causes a pulse to be generated on the lead 108, the recorder 144 will receive a small signal and the arm 146 will swing slightly to begin tracing the curve 148. It will now be apparent that as succeeding closely spaced scanning lines occur beyond the point 312, more and more signals will be stored in the capacitances until the scanning reaches the uppermost occurrences and the arm 146 has again swung back to its zero line.

From the foregoing, it is thus apparent that as the scanning operation has proceeded across the fluctuating curve of the chart 11, the output recorder 144 has drawn a curve which is similar to the one illustrated in Figure 6. This curve is a plot of the frequency of occurrences of the ink line on chart 11 as a function of the position of the particular occurrence widthwise of the chart 11. The curve thus produced lends itself to a very simple and rapid statistical analysis, in the following manner: A line one-third the height of the curve, as shown in Figure 6, is drawn through the curve parallel to the base or zero line, and the width of the curve at the interception with the one-third line is equal to two standard deviations, or the average±1 standard deviation. Other information, in addition to the standard deviation, can obviously also be obtained, such as, (1) the percentage of total length within any state of tolerance, (2) upper and lower half means, (3) total range.

It will be appreciated to those familiar with the analysis of textile charts, that the analysis provided by the output record of Figure 6 is a marked improvement over previous forms of analysis of the chart as shown in Figure 5. Previously known methods of analysis of the slivergraph chart have been very tedious and subject to errors in interpretation. These analyses, moreover, did not give a standard deviation. In more detail, the earlier analysis comprised dividing the chart into sections of equal length in determining the average range for each section. The average range was then divided by the average thickness to arrive at average range percent. The average thickness had to be obtained from a testing machine setting.

In the practice of my invention, there will, of course, be many other types of apparatus which will be the equivalent of mine in performing the operation. For example, an equally workable, but, perhaps, more complex apparatus, could be designed which would permit the chart 11 to be laid out on a flat surface and a carriage, functionally equivalent to the panel 12 (Figure 1), move in reciprocating fashion over the surface to carry out the scanning operation.

I also wish to emphasize that my invention is not limited to the analysis to the particular type of chart which has been discussed at length in this specification, but instead, obviously may be practiced to determine the occurrence of any type of indication or blemish on any type of material. The sensing means, moreover, need not be limited to light sensitive means, but may be any well-known variety of mechanical device.

Since the foregoing description has been made only for purposes of illustration, and is not intended to limit my invention, the true scope of the invention is to be determined by the appended claims.

I claim:

1. In analyzing apparatus, means for independently scanning elemental lengths of a record member wherein the elemental lengths extend parallel to a reference ordinate, means including the scanning means for detecting the occurrences of indicating marks on the member along the said elemental lengths, means for summing the occurrences of marks on each elemental length which is scanned, and means for making a record indicative of the obtained sum of the number of signals derived from the scanning of each elemental length versus the ordinate position of the elemental length on the member.

2. Apparatus for analyzing the frequency of deviations from a reference axis of recorded line on a record strip, said apparatus comprising a scanning drum adapted to have the record mounted about the circumference thereof, means for rotating the scanning drum, a source of light, a lens system for focusing a narrow beam of light on the surface of the drum, light sensitive means for receiving the light transmitted from the drum, the arrangement being such that lines on the record will alter the amount of transmitted light, the light source and light sensitive means being mounted on a movable carriage, means for moving the carriage relative to the axis of the drum as the latter rotates, whereby the beam may successively scan elemental lengths of the record, means comprising the light sensitive means for producing a single output signal of uniform magnitude and duration each time the beam passes a line on the record, means for adding the output signals in a charge storage device, means for making a record representative of the accumulated charge in the storage device at the end of each revolution of the drum, and means for automatically discharging the storage device after the representation of the charge has been recorded.

3. In apparatus for analyzing a record member, means for successively scanning elemental lengths of the record, said means including light sensitive means, the output of the light sensitive means being adapted to change when the scanning means intercepts indicating marks on the record member, electric circuit means connected with the light sensitive means and adapted to generate an output signal each time a mark on the record member actuates the light sensitive means, three electrical charge storage devices, means for storing each pulse of current in one of the charge storage devices during each elemental scanning operation, means for making a record representative of the accumulated charge in a second of the storage devices during each elemental scanning operation, means for discharging a third of the charge storage devices during each elemental scanning operation, and switch means for successively connecting the three charge storage devices to the charging, recording and discharging means, respectively, during successive elemental scanning operations.

4. Apparatus as in claim 3 wherein the switch means comprises a rotary commutator drum which is rotatably connected to the scanning drum to rotate at one-third the speed of the latter.

5. In analyzing apparatus, a scanning drum adapted to receive a record to be analyzed, means for rotating the drum, means for reflecting a beam of light from the surface of the record on the drum, means to move the light means relative to the axis of the drum in a path parallel to the said axis as the drum is rotated, whereby elemental lengths of the record are successively scanned by the beam of light, light sensitive means for receiving the reflected light, electric circuit means connected with the light sensitive means and adapted to generate a pulse of electric current each time a mark on the record member passes in the path of the light beam, three charge storage circuits each having a charge storage device, circuit means for storing the pulses of current in one of the charge storage devices during each revolution of the drum, circuit means for making a record representative of the accumulated charge in a second of the storage devices during each revolution of the drum, circuit means for discharging a third of the charge storage devices during each revolution of the drum, and switch means for successively connecting the three charge storage devices to the charging, recording and discharging circuits, respectively, during successive revolutions of the drum.

6. In apparatus for analyzing a record, a scanning drum adapted to receive the record member to be analyzed, means for rotating the drum, a source of light, means to direct a narrow beam of light to the surface of the record, light sensitive means adapted to receive the portion of the beam of light proceeding from the said surface of the record, means to detect changes in the output of the light sensitive means, whereby the occurrence of indicating marks on the record member will produce output signals from the light sensitive means, means to move the light source and the light sensitive means relative to the axis of the scanning drum as the drum is rotated, whereby elemental lengths of the record about the circumference of the drum will be successively scanned by the beam of light, a plurality of storage devices, circuit means interconnecting the light sensitive means and the storage devices for storing the output signals of the light sensitive devices in one of the storage devices during each revolution of the scanning drum, circuit means for making a record representative of the total amount of the intensity of the stored signals in a second of the storage devices during each revolution of the drum, circuit means for removing the stored signals from a third one of the storage devices during each revolution of the drum, and means for successively connecting the three storage devices to the output, recording and removal circuits, respectively, during successive revolutions of the drum.

7. Apparatus as in claim 6 wherein the detection means comprises a pulse forming circuit to produce a single pulse of a predetermined duration at the occurrence of each indicating mark.

8. Apparatus as in claim 6 wherein the means for making a record includes means to trace a curve on an answer sheet, which curve traces the totals of output signals of each elemental scanned length as a function of the position of the said elemental lengths on the record member.

9. Apparatus as in claim 7 wherein the means for making a record includes means to trace a curve on an answer sheet, which curve traces the totals of output signals of each elemental scanned length as a function of the position of the said elemental lengths on the record member.

References Cited in the file of this patent

UNITED STATES PATENTS

| Number | Name | Date |
|---|---|---|
| 1,938,990 | Woodward | Dec. 12, 1933 |
| 2,006,582 | Callahan et al. | July 2, 1935 |
| 2,199,769 | Woolley | May 7, 1940 |
| 2,222,991 | Sorkin | Nov. 26, 1940 |
| 2,243,730 | Ellis | May 27, 1941 |
| 2,360,883 | Metcalf | Oct. 24, 1944 |
| 2,413,965 | Goldsmith | Jan. 7, 1947 |
| 2,471,252 | Toulon | May 24, 1949 |
| 2,500,935 | Deitz | Mar. 21, 1950 |
| 2,514,985 | Banner | July 11, 1950 |
| 2,534,544 | Bush | Dec. 19, 1950 |